United States Patent Office 3,107,784
Patented Oct. 22, 1963

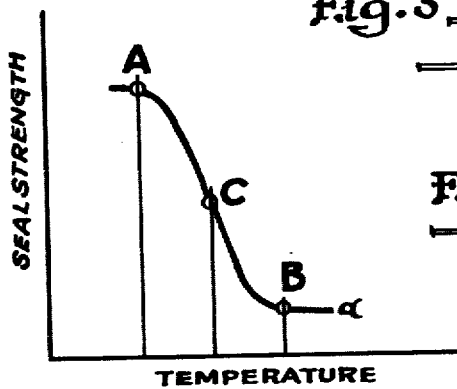
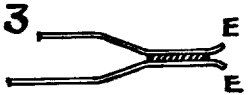
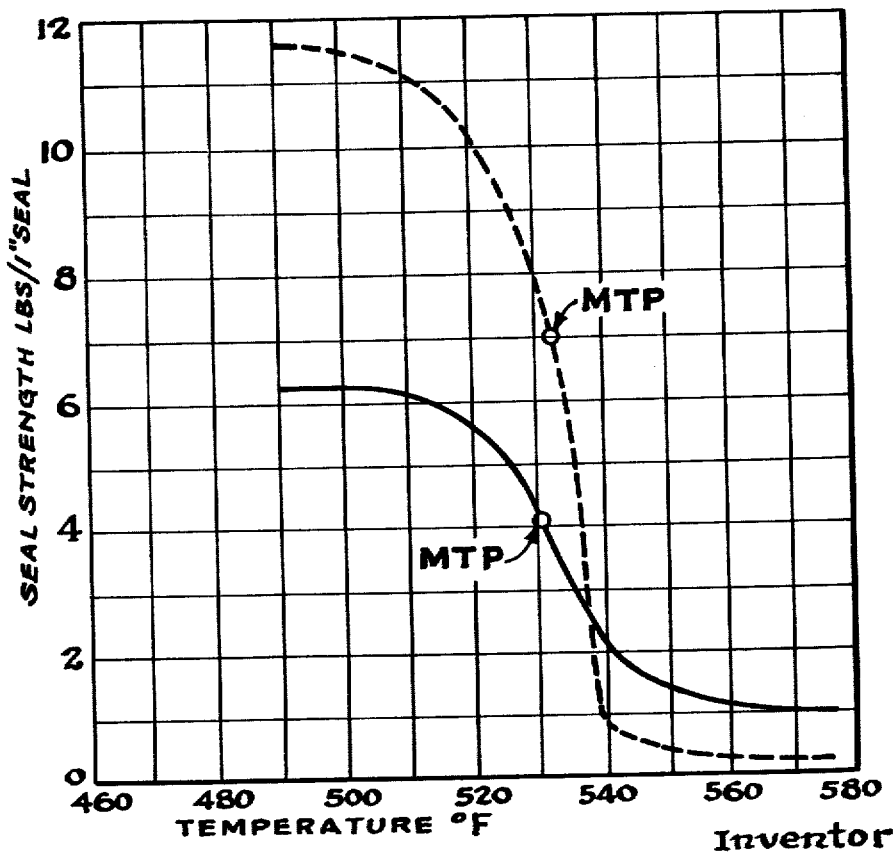

3,107,784
POLYPROPYLENE FILM PACKAGE
James E. Alder, North Chicago, and Richard W. Pecina, Waukegan, Ill., assignors to Abbott Laboratories, North Chicago, Ill., a corporation of Illinois
Filed Sept. 8, 1960, Ser. No. 54,805
3 Claims. (Cl. 206—63.2)

The present application refers to a heat seal with polypropylene films. In particular, it has to do with the provision of a polypropylene film heat-sealed in an impulse-type heat seal which can be easily torn open through the seal.

The term "heat seal" as used in the present application refers to a flexible seal, applied to two portions of a flexible film or to two flexible films, which is air and moisture tight and which is applied by a standard impulse-type heat-sealing apparatus, e.g. the apparatus marketed under the name of Vertrod 14 PC.

Heat-sealing of polypropylene films is about as old as the use of polypropylene film itself. In recent years polypropylene film has been used more and more for bags, pouches, or envelopes and has been found very useful for packaging various types of medical equipment due to its cleanliness, transparency, economics and ease of handling. Furthermore, the heat stability of polypropylene films is excellent, and properly sealed bags of polypropylene film containing various medical instruments may be sterilized and kept almost indefinitely. However, one of the great disadvantages of such polypropylene film bags is the fact that such air- or moisture-tight seals are either very weak and subject to rupture, or they are of a strength in the order of the film itself.

It has now been found that the sealing characteristics are a function of the extrusion temperature of the film, i.e. when the film is extruded at relatively high temperature, the seal easily separates and moisture, bacteria, and other foreign bodies may enter the bag and render the medical instrument useless for immediate use, and where the film is extruded at relatively low temperature, the seal is as strong as the film itself and tearing it open is almost impossible. In the latter case it is often necessary to open the bag with a sharp instrument, again making it impractical for quick opening often necessary for emergencies in medical uses. However, it has now been found that when the film is extruded within a certain temperature range, a seal can be obtained which is of good strength without being too strong to resist manual separation.

It is therefore an object of the present invention to provide a sterilizable heat-sealed polypropylene film. Another object is the provision of a polypropylene film seal which is easily tearable. A further object of the present invention is the provision of a heat-sealing method producing an easily tearable seal on polypropylene films. Still another object is the provision of an impervious, sterilization-resistant seal between polypropylene films. A still further object is the provision of a method of sterilizing surgical tools in packaged form. It is also an object of the present invention to provide a method of controlling the strength of a seal between polypropylene films.

These and other objects are accomplished by heat-sealing polypropylene films extruded within about 5–10° F. from their midtransition temperature by placing such films in a face-to-face relation and sealing them into a unitary structure by the application of heat and pressure. Such a process produces a seal that can easily be torn open but is of sufficient strength to withstand ordinary stress and strength requirements placed upon the seal during handling of sterilizing, regardless of grade of resin, film thickness, sealing conditions, and method of take-off of the film from the extrusion die.

The midtransition temperature referred to above is defined herein as the midpoint of the transition curve between the transition onset point and the point of said transition curve where a further increase in extrusion temperature does not produce further changes in the seal characteristics of this curve. The characteristic curve discussed here is that of the attached drawings.

FIGURE 1 is a stylized graph of the transition curve.

FIGURE 2 is a graph of an actual transition curve referred to in appended Example 1.

FIGURES 3 and 4 are sectional views of types of seals wherein the cross-hatched portions are the seals with free ends E.

In FIGURE 1, stylized curve α is shown in an extrusion temperature/seal strength graph. Point A is the transition onset point and point B is the point of the curve where further temperature increases produce no further substantial change in seal strength. By determination of the temperatures of points A and B, the midtransition point C, corresponding to the midtransition temperature, is easily found by dividing the temperature interval between A and B in half.

The extrusion temperature referred to above is defined as the temperature of the die as measured by means of a thermocouple which is placed within the die through which the film is extruded. Due to this type of measuring, all temperatures referred to in the present specification and claims are subject to errors of which the limit is about 10° F. in each direction.

For those skilled in the art it will be obvious that polypropylene melts can be extruded within a very wide temperature range, the minimum of which is dictated by the melt temperature of the polymer and the maximum of which is dictated by the degradation temperature of the polymer. Within this entire temperature range, a great variety of film qualities can be produced but it has now been found that only a polypropylene film extruded within about 5–10° F. of their midtransition temperature can be heat-sealed without any further film treatment to produce a tight, sterilization-resistant, impervious seal that can be torn open with ease.

The selection of the right extrusion temperature will enable predicting the strength of the seal obtained by ordinary sealing methods: where the polypropylene film is extruded about 5–10° F. below the midtransition temperature, the seal strength is higher and where a polypropylene film extruded about 5–10° F. above the midtransition temperature is used, a seal is obtained which requires little strength to tear open but is of sufficient strength to withstand sterilization and to be air and moisture tight.

The midtransition temperature defined above is a film characteristic which varies only slightly with the type of polypropylene used, the quenching the film undergoes after extrusion, the film thickness, and the sealing cycle. Thus it has been found that in a variety of different semi-commercial polypropylenes, different quench treatments, different film thicknesses, and different sealing cycles, the midtransition temperature always lies between 520° and 540° F., a spread which lies very close to the error of temperature measurements for such a process.

The foregoing is better explained by reference to the following examples which are meant as illustrations only and not intended to be limiting the invention in any form. In these examples the term polypropylene always refers to a type of polypropylene containing about 90–95% of the isotactic variety, all temperatures are measured in degrees Fahrenheit, and the seal strengths indicated refer to the strength of a 1-inch-wide seal made by heat-sealing two film strips in an impulse-type heat seal apparatus. The tear strength is measured by pulling apart the films until the seal is completely torn open.

EXAMPLE 1

A polypropylene film is made by extruding Escon No. 194 pellets (an experimental lot of a polypropylene marketed by the Enjay Corporation) through a narrow slot, producing film thicknesses of 2 and 4 mils, respectively, at various extrusion temperatures. The film is extruded at the constant rate of 1.26 lb./hr. and is subsequently quenched in a water bath or a chill roll.

Heat sealing is accomplished in an impulse-type heat seal apparatus (Vertrod 14 PC) which consists essentially of a fixed solid bed containing a heatable wire insulated with glass-filled polytetrafluoroethylene tape, the total heating assembly being ⅛-inch wide, and a ram which is pressed down lightly over the fixed bed, exerting moderate pressure on film strips lying across the fixed bed. The heat is applied through the wire for a period of 0.36 to 0.72 and 1.08 seconds, respectively (settings 3, 6 and 9, respectively) while the film strips are pressed together, and the pressure is released after a cooling period of about 3–5 seconds.

The following tear strengths are observed as averages over four to five seals of film strip samples of 1-inch width. The entry "MTP" in this table indicates the seal strength at the midtransition point which is taken from a graph drawn for the extrusion temperature/seal strength chart and does not represent a measured value.

*Table 1*

| Quenching | Extrusion Temperature,° | 0.3 sec. | | 0.72 sec. | | 1.08 sec. |
|---|---|---|---|---|---|---|
| | | 2 mils | 4 mils | 2 mils | 4 mils | 4 mils |
| Chill roll | 485 | | 10.4 | | 11.2 | 12.3 |
| | 510 | 6.2 | 9.4 | | 9.2 | 12.3 |
| | MTP | (4.2) | (5.8) | | (6.5) | (7.5) |
| | 555 | 2.3 | 0.2 | | 0.8 | 1.9 |
| | 560 | | 0.1 | | 0.6 | 1.4 |
| Water bath | 490 | | | 6.1 | 11.7 | |
| | 520 | 5.9 | 10.5 | 5.7 | 10.0 | 9.6 |
| | MTP | (3.4) | (6.1) | (4.0) | (7.0) | (7.0) |
| | 540 | 0.9 | 0.1 | 1.9 | 0.8 | 1.8 |
| | 570 | 0.4 | 0.1 | 1.0 | 0.3 | 1.2 |

The seals of the polypropylene film strips extruded within a temperature about 5–10° of the midtransition temperature can easily be torn apart and are of sufficient strength to withstand normal operating stresses, while film strips extruded at lower temperatures and sealed together can not be torn apart in the seal and those extruded at substantially higher temperatures are of inadequate strength for normal operating stresses.

This example demonstrates that differences in quenching, film thicknesses, and heat sealing periods influence the seal strength/extrusion temperature curve only to a very minor extent. From these curves it can be seen that the midtransition temperature is always within a very narrow range, i.e., it always lies between about 520° and 540°. From the above table, the columns for 2 and 4 mil films quenched in a water bath and with a sealing period of 0.72 second, are shown in the chart of FIGURE 2.

EXAMPLE 2

This example demonstrates that the seal strength/extrusion temperature curve and the midtransition temperature found on those curves are almost completely independent of the polypropylene used.

The following polypropylenes (a) Escon No. 183 (Enjay Corp.) density 0.8935
(b) Profax No. 6513 (Hercules Powder Co.) [1] density 0.9029
(c) Escon No. 234 (Enjay Corp.) [1] density 0.9017
(d) Escon No. 73 (Enjay Corp.) [1] density 0.9034
(e) Escon No. 185 (Enjay Corp.) density 0.8957
(f) Moplene A-2 (Chemore Corp.) density 0.90–0.91

[1] Denotes injection molding grade resins.

are extruded in the manner described in Example 1 and heat-sealed by laying two 1-inch-wide strips of the extruded film in face-to-face relationship across the heating element of the Vertrod apparatus described above. The following table shows the seal strengths measured of these samples and also gives the midtransition temperature for each of the resins as "MTP."

*Table 2*

| Polymer | Extrusion Temperature, degrees | Sealing Period, seconds | Film Thickness, mils | Average pull strength, pounds | MTP, degrees |
|---|---|---|---|---|---|
| (a) | 460 | 0.42 | 4.0 | 9.1 | 530 |
| | 510 | 0.36 | 3.0 | 8.1 | |
| | 520 | 0.36 | 3.0 | 4.2 | |
| | 530 | 0.36 | 3.0 | 2.2 | |
| | 535 | 0.36 | 3.0 | 1.8 | |
| | 540 | 0.36 | 3.0 | 1.9 | |
| | 550 | 0.36 | 4.0 | 1.7 | |
| | 560 | 0.36 | 5.0 | 1.1 | |
| (b) | 460 | 0.48 | 3.5 | 7.8 | 520 |
| | 510 | 0.48 | 3.0 | 4.9 | |
| | 535 | 0.48 | 2.0 | 1.3 | |
| | 545 | 0.48 | 2.0 | 1.1 | |
| | 570 | 0.48 | 2.0 | 1.1 | |
| (c) | 510 | 0.36 | 3.0 | 8.9 | 535 |
| | 520 | 0.36 | 3.0 | 9.5 | |
| | 530 | 0.36 | 3.0 | 10.1 | |
| | 540 | 0.36 | 3.0 | 1.4 | |
| | 570 | 0.36 | 3.0 | 1.4 | |
| | 590 | 0.36 | 5.0 | 0.9 | |
| (d) | 510 | 0.36 | 3.5 | 9.7 | 535 |
| | 530 | 0.36 | 3.5 | 8.2 | |
| | 540 | 0.36 | 4.5 | 2.1 | |
| | 560 | 0.36 | 3.5 | 1.6 | |
| | 570 | 0.36 | 3.0 | 1.4 | |
| | 590 | 0.36 | 4.0 | 1.5 | |
| (e) | 460 | 0.42 | 5.0 | 10.0 | 540 |
| | 510 | 0.42 | 4.0 | 8.9 | |
| | 520 | 0.48 | 3.0 | 7.8 | |
| | 535 | 0.48 | 3.0 | 8.0 | |
| | 545 | 0.48 | 4.5 | 4.2 | |
| | 560 | 0.42 | 3.0 | 1.1 | |
| (f) | 470 | 0.42 | 2.0 | 7.4 | 525 |
| | 520 | 0.42 | 2.0 | 9.7 | |
| | 530 | 0.42 | 2.0 | 1.7 | |
| | 550 | 0.42 | 2.5 | 1.6 | |
| | 560 | 0.42 | 4.5 | 1.2 | |

In all the above tests, the film strips were quenched with chill roll following extrusion and the seal strengths indicated are average values of three to five test samples.

EXAMPLE 3

A polypropylene film of 2-mils thickness and extruded at 530° F. is folded into a bag and before sealing the ends together, a hypodermic syringe is placed therein. The open ends are sealed together in a Vertrod apparatus with a heating period of 0.72 second (setting 6). The bag containing the syringe is then placed in a steam sterilization chamber and sterilized for 20 minutes at 248° F. The seal proves to be air- and moisture-tight after this treatment and allows easy opening by tearing apart the protruding loose ends near the seal.

When bags are made from polypropylene films extruded at below 510° F. the seals are so strong that opening them requires cutting the bag. Bags from polypropylene films extruded above 560° F. frequently weaken by the sterilization treatment to the point where the non-admission of germs into the bag from the outside is not assured.

From the above examples it will be seen that the invention lies in the particular selection of extrusion temperature for the polypropylene, and that the heat-sealing characteristics are relatively independent of heat-setting times, type of quenching, type of polymer, and thickness of film, when the films are extruded at a melt temperature within about 5–10° F. of their midtransition temperature. This seal strength can, by the selection of the extrusion temperature of the film within said range, be predetermined, e.g., a seal between two film strips extruded below the midtransition temperature is stronger than the seal between films extruded above the midtransition temperature.

It will also be apparent to those skilled in the art that other heat-sealing equipment may be used in place of the one described, e.g., an apparatus marketed for this purpose by the Sentinel Company; or simply a heated bar. Furthermore, the sealing characteristic used with polymers extruded at or near the midtransition temperature is a property which remains with the film, regardless of age of the particular film.

The seals produced with polypropylene films extruded within the temperature range specified have various applications in the packaging field, particularly for packaging medical instruments such as hypodermic equipment, bandages, sutures, etc. and other articles used in the medical profession, such as surgical tools, venoclysis equipment, etc. which have to be stored in sterile wrappings and for which it is desirable that they can be sterilized in packaged form. The sealed polypropylene films of the present invention are further advantageous in that they can be heat-sterilized without breaking the seal and without the seal being so tough that it cannot be opened easily and rapidly. Furthermore, seals once torn open may be resealed and the particular container sterilized again. This application is of particular importance in the field of bandages, e.g., gauzes, wound dressing strips, etc. Another important application is the sealing of containers having a plurality of pouches. In such wrappings, each individual pouch may be opened separately without any special equipment and without disturbing the sterility in the other remaining pouches. Use may be made of such an arrangement by placing a number of small medical items, e.g., wound dressing strips, hypodermic needles or similar tools, well spaced on a piece of polypropylene film, placing another film over the first film supporting the aforementioned tools, sealing the films together on the margins and between these medical tools, and sterilizing this assembly. The user subsequently opens the first of the pouches formed in this manner to remove the tool without having to disturb the sealed pouches containing the other tools. Such a polypouch bag can be further improved by perforating the seals separating the pouches, enabling the user to tear off the remains of the emptied pouch without disturbing the sterility in the other compartments.

Containers made from polypropylene films according to the present invention can vary in film thickness to a considerable extent. Envelopes, pouches, bags, etc. made and sealed in this manner may be simple in construction but may also be ornamented for display purposes.

Another application of the present invention takes advantage of the sealing characteristic of the polypropylene film to other materials. A rough surface, such as cardboard, produces a good permanent seal with a polypropylene film regardless of its extrusion temperature. Use can be made of this property by sealing the one end of polypropylene films to each side of a cardboard box and sealing the films to each other by their other ends. In this manner a good, but tear-open, closure is obtained on a form stable container which is useful as popcorn bags, etc.

Others may practice the invention in any of the numerous ways which will be suggested to one skilled in the art by the present disclosure. All such practice of the invention is considered to be part hereof provided it falls within the scope of the appended claims.

We claim:

1. A polypropylene container capable of being sterilized, wherein the polypropylene material is a film extruded at a temperature within 5–10° F. of the midtransition temperature of the films and wherein the edges are sealed to form an impervious, flexible seal by the application of heat and pressure.

2. The product of claim 1 wherein said container is a bag.

3. The product of claim 1 wherein said container encloses a medical tool.

References Cited in the file of this patent

UNITED STATES PATENTS

| | | |
|---|---|---|
| 1,180,895 | Way et al. | Apr. 25, 1916 |
| 2,804,419 | Woskin et al. | Aug. 27, 1957 |
| 2,883,262 | Borin | Apr. 21, 1959 |
| 2,908,601 | Brown et al. | Oct. 13, 1959 |
| 2,947,415 | Garth | Aug. 2, 1960 |
| 2,966,986 | Jones | Jan. 3, 1961 |

OTHER REFERENCES

Polypropylene Flm, Technical Engineering, page 113, January 1959. (Copy found in Div. 40 206–80A.)

UNITED STATES PATENT OFFICE
CERTIFICATE OF CORRECTION

Patent No. 3,107,784                        October 22, 1963

James E. Alder et al.

It is hereby certified that error appears in the above numbered patent requiring correction and that the said Letters Patent should read as corrected below.

Column 2, line 5, for "of", first occurrecne, read -- or --; column 3, line 31, for "0.36 to 0.72" read -- 0.36, 0.72 --; same column 4, Table I, heading to the third column, for "0.3 sec." read -- 0.36 sec. --.

Signed and sealed this 21st day of April 1964.

(SEAL)
Attest:

ERNEST W. SWIDER
Attesting Officer

EDWARD J. BRENNER

Commissioner of Patents